June 23, 1925.
S. O. WHITE
AUTOMOBILE BRAKE
Filed May 26, 1924
1,543,647
2 Sheets-Sheet 1
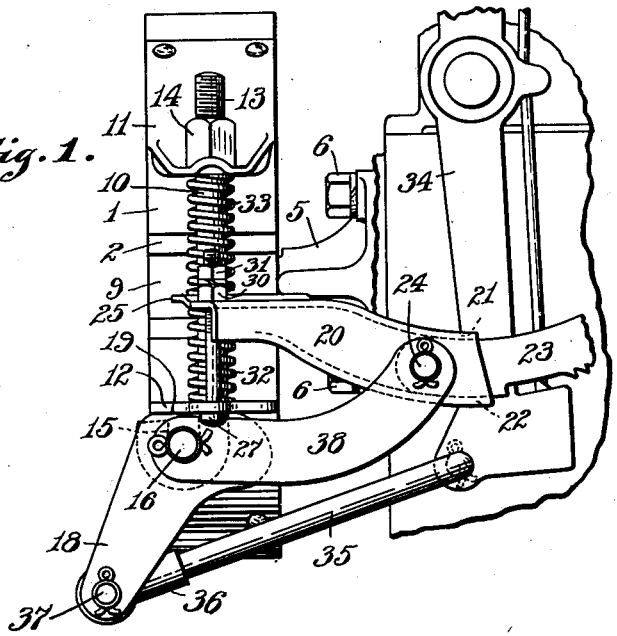
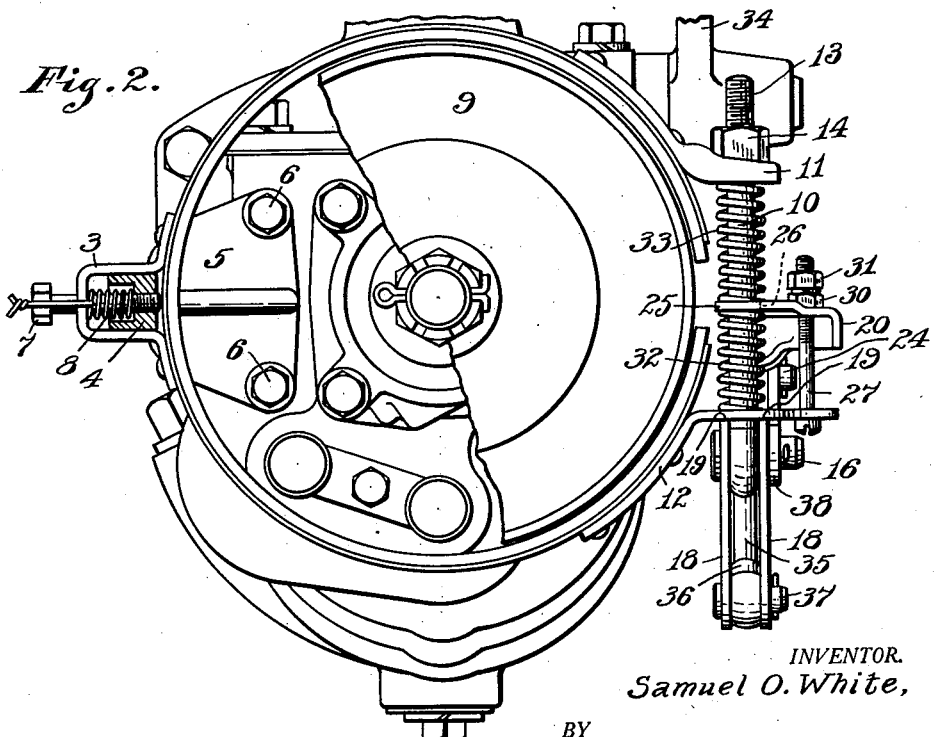
INVENTOR.
Samuel O. White,
BY
Hood + Hahn.
ATTORNEYS

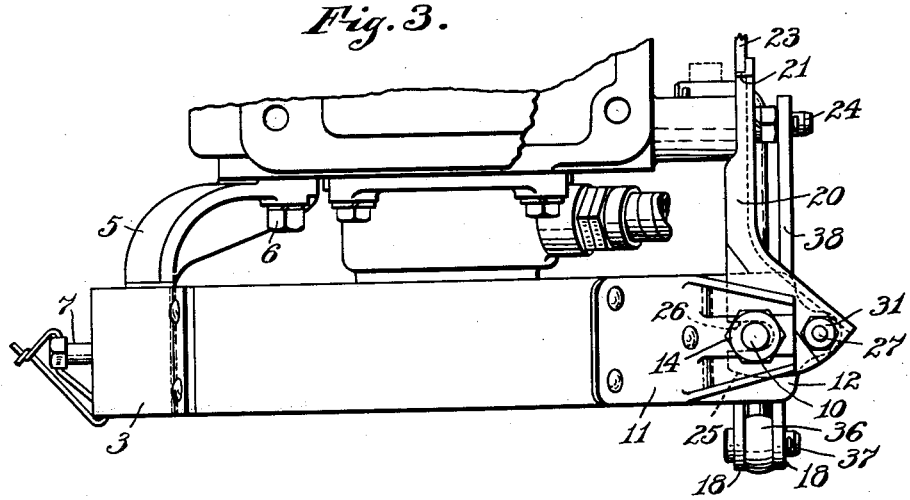
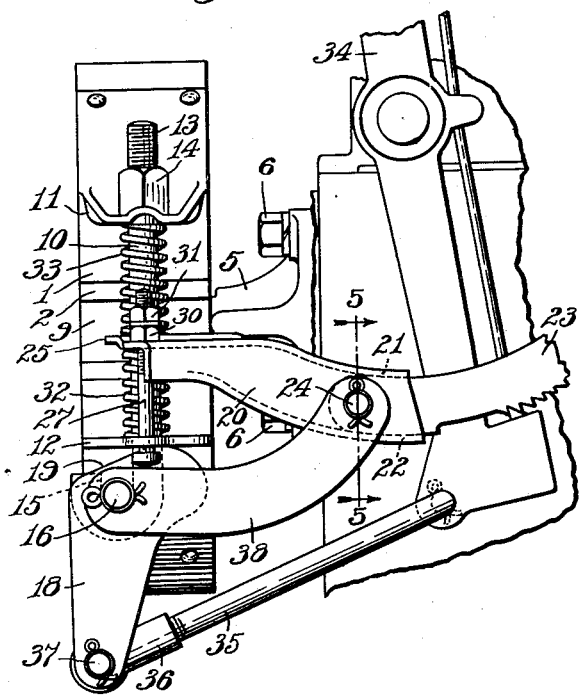
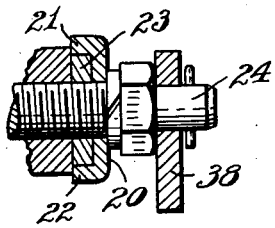

Patented June 23, 1925.

1,543,647

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

AUTOMOBILE BRAKE.

Application filed May 26, 1924. Serial No. 715,939.

*To all whom it may concern:*

Be it known that I, SAMUEL O. WHITE, a citizen of the United States, residing at Muncie, in the county of Delaware and State of Indiana, have invented a new and useful Automobile Brake, of which the following is a specification.

My invention relates to improvements in automobile brakes and particularly to that type of hand operated brake which is mounted in proximity to and supported by the transmission casing of the automobile and brakes on the transmission shaft.

One of the objects of my invention is to provide a brake of the above type which may be constructed of a minimum number of parts which may be readily mounted in position and which is not easily rendered inoperative by accumulation of dirt, etc.

For the purpose of disclosing my invention, I have illustrated one embodiment thereof in the accompanying drawings, in which—

Fig. 1 is a side elevation of an automobile transmission casing showing my brake and its mounting;

Fig. 2 is a rear elevation thereof showing particularly the brake mechanism;

Fig. 3 is a plan view;

Fig. 4 is an enlarged detail showing the action of the mechanism, and

Fig. 5 is a section on the line 5—5 of Fig. 4.

In the preferred embodiment of my invention the brake is mounted upon the rear end of the transmission housing of the automobile and is operated by a hand lever pivoted on the transmission housing.

The brake comprises the usual metallic brake band 1, which is lined with a friction lining 2, this lining taking any of the preferred forms of brake band lining which is, as usual, riveted to the metallic band. The back of the band is provided with a U shaped anchor clip 3 preferably formed of a stamping and riveted to the brake band. This anchor clip receives the end 4 of a supporting bracket 5 which is secured to the rear wall of the transmission housing by suitable cap screws 6. An adjusting screw 7 extends through the end 4 of the supporting bracket and at its inner end bears upon the brake band, and a coil spring 8 is interposed between the bracket 3 and the end 4. By this means the band is adjusted toward or away from the brake drum 9 which is mounted in any suitable manner upon the transmission shaft.

The free ends of the band are adapted to be contracted by a compression bolt 10 and to this end one of the free ends of the band has riveted thereto a top lug or bracket 11 while the opposite free end has riveted thereto a bottom lug 12 which may, if desired, be stamped from sheet metal. The bolt 10 passes through openings in the lugs and at its upper end the bolt is screw threaded as at 13 to receive the abutment nut 14 which engages the lug 11. The lower end of the bolt is provided with an eye 15 offset from the center line of the bolt through which passes a pin 16. Hung on each side of this pin is a bell crank lever 18, one leg of which is provided with a cam surface 19 adapted to engage, when the levers are manipulated, the under face of the lug 12 to to manipulate the bolt to compress the brake band. These levers 18 are formed of sheet metal and are formed in pairs as it has been found by using two thin sheet metal stampings I am enabled to get a clean shear cut in the stamping operation which gives a smooth cam surface from comparatively thin metal. To provide the requisite strength I provide two of the levers. These levers are spaced apart on the pin 16 by the bolt and in effect, hang from the bolt 10.

For supporting the free ends of the brake band, I provide a bracket 20 which is, preferably, at its rear end, channel shaped in cross section to provide a pair of ears 21 and 22 which are arranged to fit over the edge of the brake sector 23 mounted on the side of the transmission casing. The same stud, 24, to which the rear end of this brake sector is secured provides a mounting for the bracket 20. The forward end of the bracket 20 is provided with a horizontal ear 25 having formed therein, at its outer edge, an elongated slot 26 in which slides the compression bolt 10. This ear also carries a suspension bolt 27 which passes through an opening in the lug 12 and a similar opening in the ear 25, a suitable nut 30 being secured on the end of the bolt at its upper end for holding it in its desired position. A lock or jamb nut 31 holds the nut 30 in its adjusted position. A coil spring 32 surrounding compression bolt 10 is interposed between the ear 25 and the bottom lug 12 and a similar coil spring 33 is interposed between the ear 25 and the lug 11. These springs serve to separate the ends of the brake band and release the brake when the brake lever is released. The bolt 27 not only supports the lower end of the brake band, but provides a means for adjusting the brake band toward or away from the drum, while a similar adjustment for the opposite end of the brake band may be obtained by adjusting the nut 14.

The cam lever 18 is operated by the brake lever 34 which is pivoted to the side of the transmission casing and which is connected to the lower end of the cam lever by means of a link 35, threading into a socketed finger 36 having a pin 37 engaging the lever. Due to the fact that the pull of the brake rod is approximately at right angles to the plane of the brake band, there is a tendency to pull the band off the drum. In order to resist this tendency I provide a link member 38, one end of which is pivoted on the pin 24 and the other end on the pin 16. Due to this arrangement, when the brake lever is manipulated to pull on the end of the lever 18, all tendency of this pull to distort the brake band and pull the same from the brake drum is resisted. At the same time the pin 16 and compression bolt 10 may move downwardly when the lever 18 is rocked on the pin so that, while the two ends of the brake band may be readily compressed, there is no danger of the band being distorted relatively to the drum.

The link 38 effectually prevents the distortion of the brake band transversely or at right angles to the plane of the drum on which it operates. When the hand lever 34 is operated to move the cam lever 18 to contract the ends of the brake band, the cam surface 19 riding on the under side of the extension lug 12 would have a tendency to move this end in a direction at right angles to the plane of the band. However, due to the fact that the link 38 can rock on the pin 24, this tendency is counteracted by the arc in which the pin 16 is caused to move. That is, the pin 16 will move downwardly and tend to move at right angles to the plane of the band, thereby maintaining the center of the cam 19 practically constant. Furthermore, this link 38 resists any tendency on the part of the link 35 to pull the band transversely or at right angles to the plane of the band.

I claim as my invention:

1. In an automobile brake, in combination, a brake band, a compression bolt, a cam member operating transversely to the plane of the band co-operating with said bolt to contract the band, and a pivotally mounted arm extending substantially at right angles to the plane of the band connected to said bolt to permit the same to move longitudinally and prevent lateral deflection thereof.

2. In a automobile brake, in combination, a brake band, a compression bolt, means co-operating with said bolt for contracting the band and a pivotally mounted arm extending substantially at right angles to the plane of the band and connected to said bolt to prevent lateral deflection of the bolt while permitting longitudinal movement thereof.

3. In an automobile brake, in combination, a brake band, means for contracting the ends of said band and a pivotally mounted arm extending substantially at right angles to the plane of the band having a pivotal connection with one end of the band to prevent lateral deflection thereof while permitting contractile movement of said end.

4. In an automobile brake, in combination, a brake band, a compression bolt connected to the free ends thereof, a cam lever pivoted to one end of said bolt to co-operate therewith to contract said band and operating transversely to the plane of the band and an arm extending substantially at right angles to the plane of the band pivotally connected to said lever pivot and to a relatively stationary pivot at its opposite end to prevent lateral deflection of the band.

5. In an automobile brake, in combination, a brake band, a compression bolt, extending through the free ends of said band, a bell crank cam lever pivotally connected to one end of said bolt at a point offset from the center line of said bolt operating transversely to the plane of said band and co-operating with said bolt to contract the free ends of the band, and an arm extending at right angles to the plane of the band stationarily pivoted at one end and having its opposite end connected to the cam lever pivot.

6. The combination with a transmission casing, of a brake band mounted substantially parallel with the rear end of said casing, a compression bolt connected to the free ends of said brake band, a cam lever pivotally connected to one end of said bolt and co-operating therewith to contract the free ends of the band and operating transversely to the plane of said band, an operating lever for manipulating said cam lever mounted on one side of the transmission casing and connected to the cam lever and an arm pivotally mounted on one side of the transmission casing and connected at its free end with said compression bolt.

7. In an automobile brake, the combination with a brake band having extension lugs at its free ends, a stationarily mounted bracket having a portion intermediate of said lugs and substantially parallel therewith, a compression bolt extending through said lugs and said parallel portion of the bracket, a nut at one end of said bolt and a cam lever pivotally connected to the other end of said bolt and co-operating with said bolt to contract the free ends of the band, a pair of springs surrounding said bolt and interposed between the parallel portion of said bracket and the ears of said band, a bolt extending through said bracket and through one of the ears of said band for limiting the movement of one end of the band in one direction and an arm pivotally connected at one end to the pivotal mounting of the cam lever and to a stationary member at its opposite end and extending transversely to the plane of the band for preventing lateral deflection of said band while permitting contractal movement of the ends of the band.

8. The combination with a transmission casing, of a brake band mounted at the rear thereof and substantially parallel with the rear end and having extension ears on the free ends thereof, of a brake lever pivotally mounted on one side of said casing, a rack sector mounted on one side of said casing and co-operating with said lever, a bracket formed of sheet metal having a channel portion in which said rack sector fits and secured in position by one of the pins securing said rack sector in position and having a substantially horizontal ear arranged intermediate of the brake band ears, a compression bolt extending through said bracket and said ears, a nut on one end of said bolt, a bell crank cam lever pivotally connected to the other end of said bolt at a point offset from the center line of said bolt, a bolt extending through said bracket and one of the brake band ears for limiting the movement of said ear in one direction, an arm connected to said cam lever pivot at one end and at its opposite end to the pin on which said bracket is mounted and a link extending between the end of the brake lever and one arm of the bell crank cam lever.

9. The combination with a transmission casing, of a brake band mounted at the rear thereof and substantially parallel with the rear end and having extension ears on the free ends thereof, of a brake lever pivotally mounted on one side of said casing, a rack sector mounted on one side of the casing and co-operating with said lever, a bracket having a channel portion in which said rack sector fits and secured in position by one of the pins securing said rack sector in position and having a substantially horizontal ear arranged intermediate of the brake band ears, a compression bolt extending through said bracket and said ears, a nut on one end of said bolt, a bell crank cam lever pivotally connected to the other end of said bolt, a bolt extending through said bracket and one of the brake band ears for limiting the movement of said ear in one direction, an arm connected to said cam lever pivot at one end and at its opposite end to the pin on which said bracket is mounted, and a link extending between the end of the brake lever and one arm of the bell crank cam lever.

In witness whereof, I SAMUEL O. WHITE, have hereunto set my hand at Munice, Indiana, this 23rd day of May, A. D. one thousand nine hundred and twenty four.

SAMUEL O. WHITE.